US008565675B2

(12) United States Patent
Bangs et al.

(10) Patent No.: US 8,565,675 B2
(45) Date of Patent: Oct. 22, 2013

(54) NEAR FIELD RF COMMUNICATORS AND NEAR FIELD RF COMMUNICATIONS-ENABLED DEVICES

(75) Inventors: Joakim Bangs, Swindon (GB); David Miles, Somerford Keynes (GB)

(73) Assignee: Broadcom Innovision Limited, Cambridge (GB)

( * ) Notice: Subject to any disclaimer, the term of this patent is extended or adjusted under 35 U.S.C. 154(b) by 1044 days.

(21) Appl. No.: 12/516,233

(22) PCT Filed: Nov. 27, 2007

(86) PCT No.: PCT/GB2007/004528
§ 371 (c)(1),
(2), (4) Date: Jul. 29, 2009

(87) PCT Pub. No.: WO2008/065379
PCT Pub. Date: Jun. 5, 2008

(65) Prior Publication Data
US 2010/0068999 A1    Mar. 18, 2010

(30) Foreign Application Priority Data
Nov. 27, 2006 (GB) .................................. 0623653.3

(51) Int. Cl.
*H04B 5/00* (2006.01)
(52) U.S. Cl.
USPC .......... 455/41.1; 455/500; 455/501; 455/515; 455/517; 455/522; 455/63.13; 455/92; 455/134; 330/252; 330/257
(58) Field of Classification Search
None
See application file for complete search history.

(56) References Cited

U.S. PATENT DOCUMENTS 5,099,227 A * 3/1992 Geiszler et al. ............ 340/572.5
(Continued)

FOREIGN PATENT DOCUMENTS

EP    1693957 A    8/2006
WO   9101531 A1   2/1991

OTHER PUBLICATIONS

Wai-Kai, Analog Circuits and Devices, CRC Press 2003. p. 3-12 Figure 3.13 and p. 3-16 Figure 3.19.*

(Continued)

*Primary Examiner* — Fayyaz Alam
*Assistant Examiner* — Mohammed Rachedine
(74) *Attorney, Agent, or Firm* — Sterne, Kessler, Goldstein & Fox P.L.L.C.

(57) ABSTRACT

A near field RF communicator has an antenna circuit (120) to receive a modulated radio frequency signal by inductive coupling and demodulation circuitry (130 or 131) to extract the modulation from a received modulated radio frequency signal inductively coupled to the antenna circuit. The demodulation circuitry has a virtual earth input comprising a current mirror. The demodulation circuitry may be formed by an amplifier (115 or 116) and a demodulator (114) coupled to an output of the amplifier. The amplifier may be a single input amplifier (116) coupled to an output of the antenna circuit or may be a differential amplifier (115) having first and second inputs to receive the modulated radio frequency signal from first and second outputs of the antenna circuit, with each amplifier input providing a virtual earth input.

18 Claims, 5 Drawing Sheets

(56) References Cited

U.S. PATENT DOCUMENTS

| | | | |
|---|---|---|---|
| 5,889,489 A | 3/1999 | Friedman et al. | |
| 6,704,560 B1 * | 3/2004 | Balteanu et al. | 455/333 |
| 7,309,002 B2 * | 12/2007 | Fernandez | 235/376 |
| 8,145,155 B2 * | 3/2012 | Pullela et al. | 455/118 |
| 2004/0155753 A1 | 8/2004 | Fischer | |
| 2005/0062472 A1 | 3/2005 | Bottomley | |
| 2006/0113373 A1 * | 6/2006 | Fernandez | 235/375 |

OTHER PUBLICATIONS

International Searching Authority—European Patent Office, International Search Report and Written Opinion for PCT/GB2007/004528, May 20, 2008, 13 pages.

United Kingdom Patent Office; Patents Act 1977: Search Report Under Section 17 for Application No. GB0723221.8, Jan. 29, 2008, 7 pages.

* cited by examiner

NEAR FIELD RF COMMUNICATORS AND NEAR FIELD RF COMMUNICATIONS-ENABLED DEVICES

CROSS REFERENCE TO RELATED APPLICATIONS

This application is a national stage application under 35 U.S.C. §371 of International Application No. PCT/GB2007/004528, filed Nov. 27, 2007, which claims the priority of United Kingdom Application No. 0623653.3, filed Nov. 27, 2006, the contents of which are herein incorporated by reference.

FIELD OF THE INVENTION

This invention relates to near field RF communicators and near field RF communications-enabled devices.

BACKGROUND OF THE INVENTION

Near field RF (radio frequency) communication requires an antenna of one near field RF communicator to be present within the alternating magnetic field (H field) generated by the antenna of another near field RF communicator by transmission of an RF signal (for example a 13.56 Mega Hertz signal) to enable the magnetic field (H field) of the RF signal to be inductively coupled between the communicators. The RF signal may be modulated to enable communication of control and/or other data. Ranges of up to several centimeters (generally a maximum of 1 meter) are common for near field RF communicators.

Near field communication may be referred to as near-field RFID (Radio Frequency Identification) or near-field communication. NFC communicators are a type of near field RF communicator that is capable of both initiating a near field RF communication (through transmission or generation of an alternating magnetic field) with another near field RF communicator and of responding to initiation of a near field RF communication by another near field RF communicator. The term "near field RF communicator" includes not only NFC communicators but also initiating near field RF communicators such as RFID transceivers or readers that are capable of initiating a near field RF communication but not responding to initiation of a near field RF communication by another near field RF communicator and responding near field RF communicators such as RFID transponders or tags that are capable of responding to initiation of a near field RF communication by another near field RF communicator but not of initiating a near field RF communication with another near field RF communicator. Hence NFC communicators can act as both RFID transceivers and RFID transponders and are able to communicate with other NFC communicators, RFID transceivers and RFID transponders.

Examples of near field RF communicators are defined in various standards for example ISO/IEC 18092, ISO/IEC 14443, ISO/IEC 15693 ISO/IEC 21481.

Near field RF communicators may be provided as standalone or discrete devices or may be incorporated within or coupled to larger electrical devices or host devices (referred to below as near field RF communications-enabled devices) to enable those devices to communicate by the near field with other near field RF communicators or devices incorporating or coupled to such near field RF communicators. When incorporated within a larger device or host, a near field RF communicator may be a discrete entity or may be provided by functionality within the larger device or host. Examples of such larger devices or host devices are, for example, mobile telephones, portable computing devices (such as personal digital assistants, notebooks, lap-tops), other computing devices such as personal or desk top computers, computer peripherals such as printers, or other electrical devices such as portable audio and/or video players such as MP3 players, IPODs®, CD players, DVD players.

When a first near field RF communicator receives a modulated RF signal from a second near field RF communicator, this modulated RF signal is received by the antenna circuit of the first near field RF communicator and must then be demodulated by a demodulator within the near field RF communicator. However with existing designs the demodulator inputs tend to be high impedance and this can lead to a significant reduction in the Q of the antenna circuit and inability to maximize the modulated carrier signal being input to the demodulator. Where high input impedance voltage couplings are made to the demodulation circuitry, it may be necessary to divide-down the voltage of a received modulated carrier signal to avoid over-voltage damage which may otherwise occur when very high magnetic fields couple to the antenna coil. This limitation on the maximum voltage which can be allowed to develop at the antenna coil makes it difficult to adjust the dynamic range of the circuit as regards received signals.

SUMMARY OF THE INVENTION

According to an aspect of the present invention, there is provided a near field RF communicator having demodulation circuitry of low input impedance, for example having virtual earth or current mirror input or inputs.

According to an aspect of the present invention, there is provided a near field RF communicator comprising: an antenna circuit to receive a modulated radio frequency signal by inductive coupling; and demodulation circuitry to extract the modulation from a received modulated radio frequency signal inductively coupled to the antenna circuit, wherein the demodulation circuitry has a virtual earth input.

Embodiments of the present invention provide demodulator inputs of low impedance enabling significant reduction in the Q of the antenna circuit to be avoided, and hence also avoiding loss of coupling strength between near field RF communicators. In addition, in contrast to the case where high input impedance voltage couplings are used, it should not be necessary to divide-down the voltage of a received modulated carrier signal to avoid over-voltage damage which may otherwise occur when very high magnetic fields couple to the antenna coil and so the modulated carrier signal input may be increased or maximised. Embodiments of the present invention may also make it easier to adjust the dynamic range in current mode by for example using switchable parallel coupled transistors in the current mirror to control the current mirror ratio.

In an embodiment, the demodulation circuitry comprises a virtual earth input amplifier and a demodulator. The amplifier may be a single input amplifier and may have a virtual earth input.

In an embodiment, the demodulation circuitry has a first modulated signal input to receive a first modulated radio frequency signal from a first output of the antenna circuit and a second modulated signal input to receive a second modulated radio frequency signal from a second output of the antenna circuit and the demodulation circuitry is operable to extract modulation from a received modulated RF signal using both the first and second modulated radio frequency signals and wherein the first and second inputs are virtual earth inputs.

In an embodiment, the demodulation circuitry comprises: a differential amplifier having a non-inverting input coupled to receive a first modulated radio frequency signal from a first output of the antenna circuit, an inverting input coupled to receive a second modulated radio frequency signal from a second output of the antenna circuit, and an output, the non-inverting and inverting inputs being virtual earth inputs; and a demodulator coupled to the output of the differential amplifier.

In an embodiment, a coil of the antenna circuit is coupled across the first and second outputs of the antenna circuit.

In an embodiment, each virtual earth comprises a current mirror. Each current mirror may comprise a diode-coupled transistor having a main electrode coupled to the or the corresponding input and a further transistor having its control gate coupled to the control gate of the diode-coupled transistor such that, in operation, a current at the input of the demodulation circuitry is mirrored by the further transistor to provide an input current to the demodulation circuitry. The diode-coupled transistor and the further transistor may be field effect transistors.

A near field RF communicator embodying the invention may further comprise a modulator operable to modulate a radio frequency signal in accordance with data to enable communication of data by the near field RF communicator.

A near field RF communicator embodying the invention may further comprise a signal generator to provide a radio frequency signal, the signal generator being operable to cause modulation of the radio frequency signal in accordance with data to enable communication of data by the near field RF communicator.

A near field RF communicator embodying the invention may further comprise a data store operable to store data, a modulator operable to modulate a radio frequency signal in accordance with data, and a controller operable both to initiate near field radio frequency communication with another near field RF communicator and to respond to near field radio frequency communication initiated by another near field RF communicator.

A near field RF communicator embodying the invention may further comprise a power deriver operable to derive power from a radio frequency signal inductively coupled to the coupler.

The near field RF communicator may be an NFC communicator. Embodiments of the present invention provide significantly less noise-sensitive near field RF communicators and minimisation of overloading.

BRIEF DESCRIPTION OF THE DRAWINGS

Embodiments of the present invention will now be described, by way of example, with reference to the accompanying drawings, in which.

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these. The NFC communicator may be provided wholly or partially as an integrated circuit or collection(s) of integrated circuits.

DETAILED DESCRIPTION OF THE INVENTION

Figure 1:
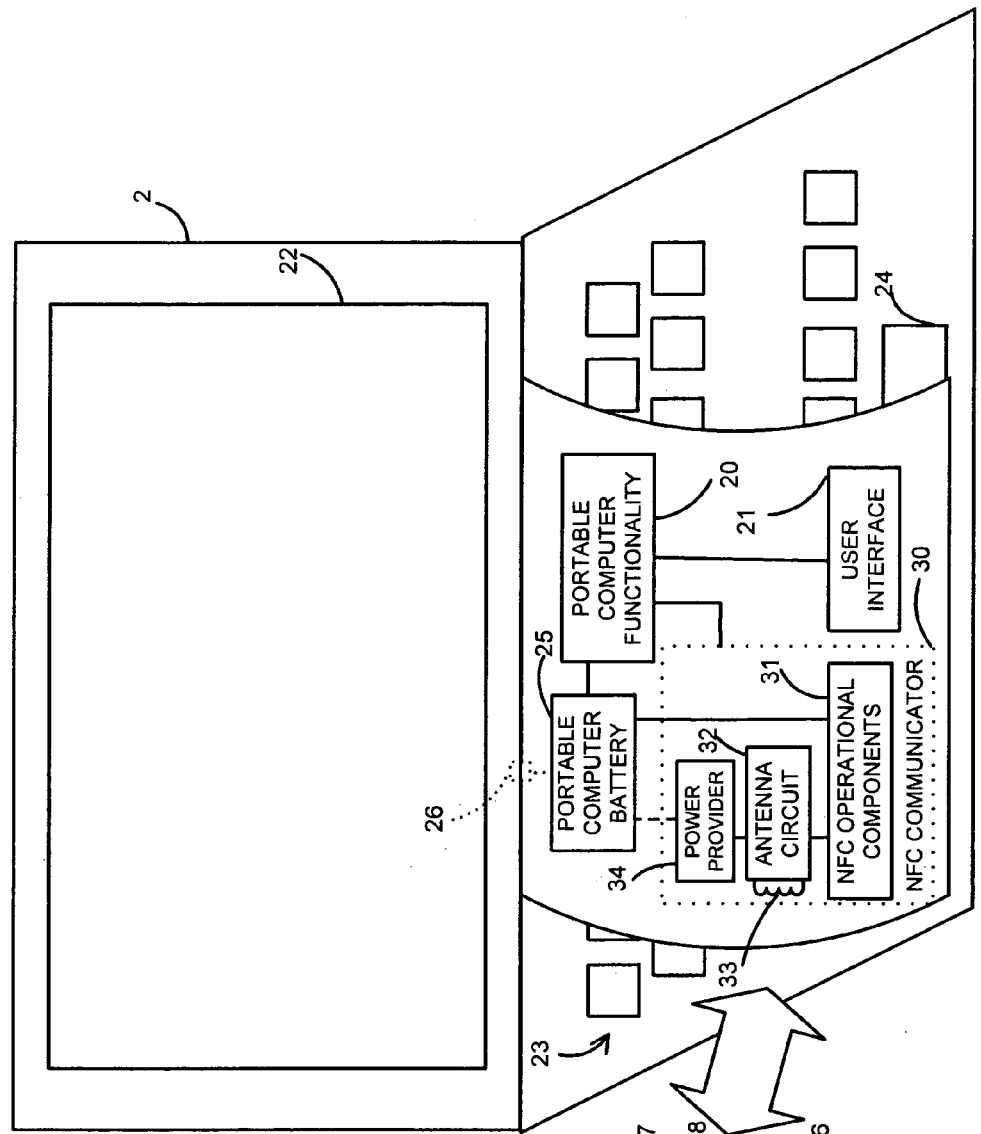
FIG. 1 shows a representational diagram illustrating communication between two devices comprising NFC communicators.

Referring now specifically to FIG. 1, there is shown a representational diagram illustrating communication between two NFC communications-enabled devices. In FIG. 1 the representations of the NFC communications-enabled devices have been shown partly cut-away and the functionality provided by the NFC communications-enabled devices illustrated by way of a functional block diagram within the NFC communications-enabled device.

As shown in FIG. 1, one NFC communications-enabled device comprises a mobile telephone (cellular telephone, "cellphone") 1 and the other NFC communications-enabled device comprises a portable computer 2 such as a notebook or laptop computer.

The mobile telephone 1 has the usual features of a mobile telephone including mobile telephone functionality 10 (in the form of, usually, a programmed controller, generally a processor or microprocessor with associated memory or data storage, for controlling operation of the mobile telephone in combination with a SIM card), an antenna 8 for enabling connection to a mobile telecommunications network, and a user interface 3 with a display 4, a keypad 5, a microphone 6 for receiving user voice input and a loudspeaker 7 for outputting received audio to the user. The mobile telephone also has a chargeable battery 11 coupled to a charging socket 12 via which a mains adapter (not shown) may be connected to enable charging of the battery 11. The mobile telephone 1 may have an alternative or additional power supply (not shown), for example a reserve battery or emergency battery.

Similarly the portable computer 2 has the usual features of a portable computer including portable computer functionality 20 in the form of, usually, a processor with associated memory in the form of ROM, RAM and/or hard disk drive, one or more removable media drives such as a floppy disk drive and/or a CDROM or DVD drive, and possibly a communications device for enabling the portable computer to connect to a network such as the Internet. The portable computer 2 also includes a user interface 21 including a display 22, a keyboard 23 and a pointing device, as shown a touchpad 24. The portable computer 2 also has a chargeable battery 25 coupled to a charging socket 26 via which a mains adapter (not shown) may be connected to enable charging of the battery 25.

In addition, as shown in FIG. 1, the NFC communications-enabled devices 1 and 2 each have an NFC communicator 15 and 30. As shown, the NFC communicators 15 and 30 are incorporated within the larger devices and, as with the other functional blocks, may be discrete entities within the host devices or may be provided by features dispersed throughout or integrated within the host device or a part of the host device.

Each NFC communicator 15 and 30 comprises NFC operational components 16 and 31 for, as will be described below, enabling control of the NFC functionality and generation, modulation and demodulation of an RF signal. Each NFC communicator 15 and 30 also comprises a coupler or antenna circuit 17 and 32 comprising an inductor or coil in the form of an antenna 18 and 33. The couplers 17 and 32 enable an alternating magnetic field (H field) generated by the antenna of one near field RF communicator 15 (or 30) by transmission of an RF signal (for example a 13.56 Mega Hertz signal) to be inductively coupled to the antenna of the other near field RF communicator 30 (or 15) when that antenna is within the near field of the RF signal generated by the one near field RF communicator 15 (or 30).

The NFC communicators 15 and 30 are coupled to the mobile telephone and portable computer functionality 10 and 20, respectively, to enable data and/or control commands to be sent between the NFC communicator and the host device and to enable user input to the NFC communicator. Communication between the user interface 3 or 21 and the NFC communicator 15 or 30 is via the host device functionality 11 or 20, respectively.

Each NFC communicator 15 and 30 also comprises a power provider 19 and 34. The power providers 19 and 34 may be power supplies within the host device or specific to the NFC communicators 15 and 30, for example a button cell battery, or other small battery. As another possibility or additionally as shown by dashed lines in FIG. 1, one or both of the power providers 19 and 34 may simply comprise a coupling to derive power from the corresponding device battery 11 or 25.

It will be appreciated that FIG. 1 shows only examples of types of host devices. A host device may be another type of electrical device such as a personal digital assistant (PDA), other portable electrical device such as a portable audio and/or video player such as an MP3 player, an IPOD®, CD player, DVD player or other electrical device.

Rather than being incorporated within the host device, the NFC communicator 15 or 30 may be associated with the host device, for example by a wired or wireless coupling. In such a case, a housing of the NFC communicator may be physically separate from or may be attached to the housing of the host device; in the later case, the attachment may be permanent once made or the NFC communicator may be removable. For example, the NFC communicator may be housed within: a housing attachable to another device; a housing portion, such as a fascia of the NFC communications-enabled device or another device; an access card; or may have a housing shaped or configured to look like a smart card. For example an NFC communicator may be coupled to a larger device by way of a communications link such as, for example, a USB link, or may be provided as a card (for example a PCMCIA card or a card that looks like a smart card) which can be received in an appropriate slot of the larger or host device.

Figure 2:
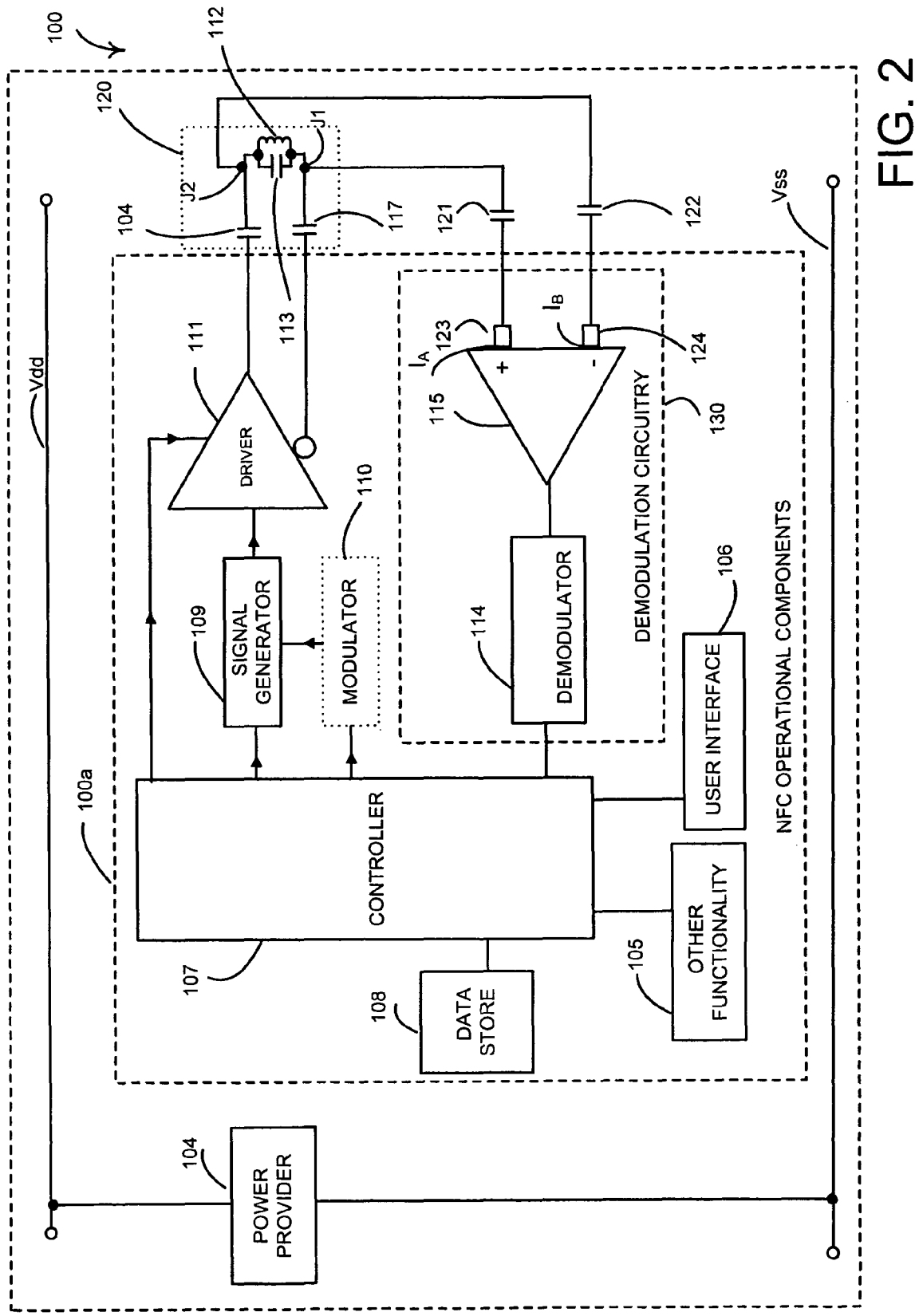
FIG. 2 shows one embodiment of an NFC communicator according to the present invention.

FIG. 2 shows a functional block diagram of an NFC communications-enabled device 100 in accordance with the invention to illustrate one way in which the NFC operational components 100a of an NFC communications-enabled device embodying the invention may be implemented.

As shown in FIG. 2, the NFC operational components include a controller 107 to control overall operation of the NFC communicator, demodulation circuitry 130 (described in greater detail below) to enable demodulation of a modulated RF signal coupled to an antenna circuit 120 to enable data to be communicated to the NFC communicator, and modulation circuitry to enable modulation of an RF signal to enable data to be communicated by the NFC communicator. Data (information and/or control data) to be communicated may be read from, and received demodulated data may stored, in any appropriate data store, for example one or more of an internal memory of the controller 107, a data store 108 associated with the controller 107, a host device data store where the NFC communicator has a host, or an associated standalone data store.

The NFC communicator may operate using any appropriate modulation scheme that is in accordance with the standards and/or protocols under which the NFC communicator operates.

As shown in FIG. 2, the modulation circuitry comprises a signal generator 109 coupled via a driver 111 to the antenna circuit 120. The driver may be a Class D output driver, although a Class A, a Class B or a Class AB output driver may be used, or an emitter-follower or source-follower may be used, for example. In this example, the signal generator 110 is controlled by the controller 107 to cause modulation by gating or switching on and off an RF signal in accordance with the data to be communicated. As another possibility, a separate or further signal controller or modulator 110 (shown in phantom lines in FIG. 2) may be incorporated within the NFC operational components and coupled to the signal generator 109 to control modulation of the signal generated by the signal generator 109 in accordance with data or instructions received from the controller 107. As another possibility, the signal generator 109 may provide an unmodulated signal and modulation may be achieved by using, rather than the single-input driver shown in FIG. 2, a differential driver having its other input coupled to a data output of the controller 107 to modulate the output of the driver, for example by gating or switching on and off the driver 111, in accordance with the data to be communicated.

Generally the signal generator 109 will include an oscillator to generate the RF signal, although it may be possible for the signal generator to generate the RF signal from a clock of the controller 107 or a clock or oscillator of a host device. The controller 107 may, as shown in FIG. 2, be coupled to the driver 111 to control the gain of the driver and thus the modulation depth of a modulated RF signal.

In the example shown in FIG. 2, the antenna circuit 120 comprises an antenna coil 112 coupled in parallel with a capacitor 113. As is known in the art, the antenna circuit 120 may also include filtering capacitors to reduce harmonics and comply with electromagnetic energy emission regulations. As shown in FIG. 2, the driver 111 has its non-inverting output coupled via a capacitor 104 to one junction J2 between the capacitor 113 and the antenna coil 112 and its inverting output coupled via a capacitor 117 to the other junction J1 between the capacitor 113 and the antenna coil 112.

The controller 107 controls overall operation of the NFC communicator. The controller 107 may be, for example, a microprocessor, for example a RISC processor or other microprocessor, or a state machine. Program instructions for programming the controller and/or control data for communication to another near field RF communicator may be stored in an internal memory of the controller 107 and/or the data store 108.

The NFC communicator 100a also has or is associated with a power provider 104 coupled between power supply lines Vdd and Vss. The power provider 104 may be any one or more of the types of power providers discussed above. In the interests of simplicity, power supply couplings from the power provider 104 to other components are not shown in FIG. 2.

The NFC communicator 100a may or may not have or be capable of being connected or coupled with at least one of other functionality 105 (for example functionality of a host device such as described above) and a user interface 106. One or both of the NFC communications enabled devices may be a standalone NFC communicator, that is it may have no functionality beyond its NFC communications functionality, although it may possibly have its own user interface and perhaps further functionality specific to the standalone NFC communicator. The other functionality 105 may provide at least some of the control functions of the controller 107. For example the NFC communicator controller 107 may control modulation and modulation protocols Whereas the data to be transmitted may be provided by other functionality 105.

In FIG. 2, the controller 107, the power provider 104, data store 108, other functionality 105 and user interface 106 are shown as part of the NFC communicator. One or more of these may, however, at least in part be provided by a host or another device couplable by a wired or wireless coupling to the NFC communicator.

The NFC communicator 100a may operate in an initiator mode (that is as an initiating near field RF communicator) or a target mode (that is as a responding near field RF communicator), dependent on the mode to which the NFC communicator is set. The mode may be determined by the controller 107 or may be determined in dependence on the nature of a received near field RF signal. When in initiator mode, an NFC communicator initiates communications with any compatible responding near field RF communicator capable of responding to the initiating NFC communicator (for example an NFC communicator in target mode or an RFID tag or transponder) that is in its near field range, while when in target mode an NFC communicator waits for a communication from a compatible initiating near field RF communicator (for example an NFC communicator in initiator mode or an RFID initiator or transceiver). As thus used, compatible means operable at the same frequency and in accordance with the same protocols, for example in accordance with the protocols set out in various standards such as ISO/IEC 18092, ISO/IEC 21481, ISO/IEC 14443 and ISO/IEC 15693.

When in initiator or target mode, the NFC communicator may communicate in accordance with an active or passive protocol. When using an active protocol the initiating NFC communicator will transmit an RF field and following completion of its data communication turn off its RF field. The responding near field RF communicator (target) will then transmit its own RF field and data before again turning off the RF field and so on. When using a passive protocol the NFC communicator (initiator) will transmit and maintain its RF field throughout the entire communication sequence. The protocol used will depend on instructions received form the controller 107 and the response received from a responding near field RF communicator.

In the example shown in FIG. 2, the demodulation circuitry comprises a differential amplifier 115 having one input (as shown its non-inverting input) coupled via a capacitor 121 to the junction J1 of the antenna circuit 120 and its other input (as shown its inverting input) coupled via a capacitor 122 to the junction J2 of the antenna circuit 120 and a demodulator 114 coupled to the output of the differential amplifier 119. When a modulated RF signal is inductively coupled to the antenna circuit 120, a differential signal is developed across the antenna coil junctions J1 and J2 and as these are coupled to respective inputs of the differential amplifier 115, the differential amplifier 115 acts to amplify the modulated RF signal and to remove DC/common mode components. The demodulator 114 acts to extract the modulation from the amplified modulated RF signal output by the differential amplifier. In the example shown in FIG. 2, the demodulator 114 is coupled to supply the extracted data directly to the controller 107 for processing. There may, however, be some prior signal processing, for example an A/D converter may be provided to convert the output of the demodulator 114 to a digital input signal for the controller 107.

The capacitors 121 and 122 are shown as being outside the NFC operational components 100a to indicate that, where the NFC operational components 100a are provided by an integrated circuit, the capacitors 121 and 122 are, like the antenna circuit, external to the integrated circuit.

The differential amplifier 115 has low impedance input circuits 123 and 124 to provide current inputs $I_A$ and $I_B$ for the differential amplifier. These low impedance input circuits 123 and 124 may be virtual earth, that is current mirror, circuits responsive to the current flowing into the corresponding input. The two virtual earth circuits 123 and 124 will be the same to enable common mode rejection.

Figure 4:
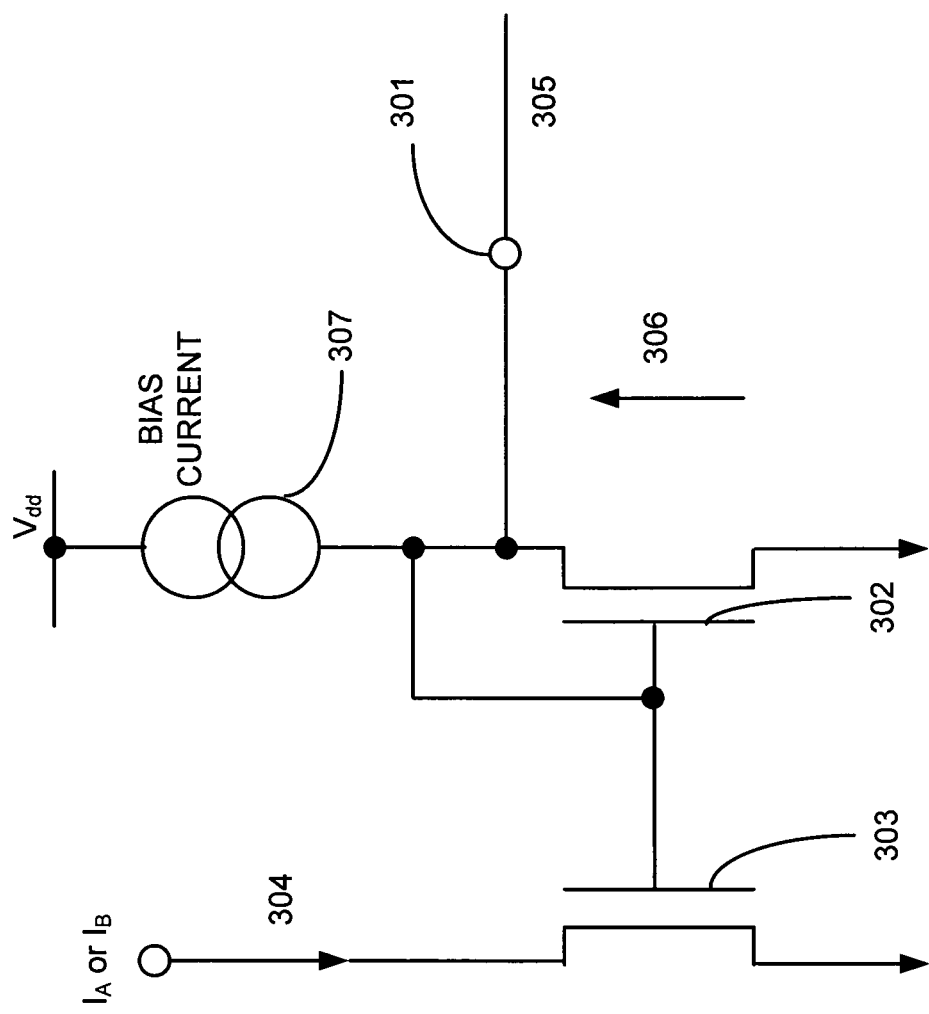
FIG. 4 shows a virtual earth (virtual ground) circuit that may be used in an NFC communicator according to the present invention.

FIG. 4 shows an example of such a virtual earth circuit 123 or 124. In the example shown in FIG. 4, node 301 represents the input of the differential amplifier 115. The virtual earth circuit 123 or 124 comprises a current mirror having a first transistor 302 having its first main electrode coupled via a bias current source 307 to power supply line Vdd (see FIG. 2) and its second main electrode coupled to the power supply line Vss. The first main electrode of the first transistor 302 is coupled to the input node 301 and to its control electrode so that the transistor is diode-coupled. The control electrode of the first transistor 302 is also coupled to the control electrode of a second transistor 303 having its second main electrode coupled to the power supply line Vss and its first main electrode coupled to an output 308 of the current mirror to provide output current $I_A$ or $I_B$, where $I_A$ and $I_B$ are the current inputs from the corresponding input circuits to the non-inverting and inverting differential amplifier inputs, respectively.

In this example, the first and second transistors 302 and 303 are n channel field effect transistors (FETs), for example NMOS transistors and so the first main electrode is the drain electrode and the second main electrode is the source electrode. The bias current source 307 may be provided by a PMOS current mirror coupled to Vdd. It may be possible to use other forms of transistors such as bipolar transistors.

In operation of the virtual earth circuit 123 or 124 shown in FIG. 4, the capacitors 121 and 122 which are of very low capacitance, for example 0.5 or 1 picofarad, act as voltage-to-current converters for the virtual earth circuits 123 and 124. These capacitors may, where better tolerances are required than can be achieved with discrete capacitor components, be formed by copper tracks on a printed circuit board of the NFC communicator. The current 305 input at node 301 is mirrored as current 304 flowing through transistor 303 and the mirrored input current 304 provides the actual input to the differential amplifier 115 and thus "represents" the input current within the differential amplifier 115. The current mirror may provide any appropriate current mirror ratio. The current mirror ratio may be adjusted by, for example, replacing transistor 303 by plural transistors coupled in parallel and/or by varying the channel length/width ratio. The current mirror ratio of the virtual earth circuits 123 and 124 should of course be the same.

The modulated carrier signals supplied to the differential amplifier 115 inputs comprise an AC voltage. Providing the virtual earth circuits 123 and 124 causes, because of the resulting very low input impedances, current to flow through capacitor 121 into the amplifier non-inverting input and current to flow through capacitor 122 into the amplifier inverting input. The differential amplifier 115 outputs a voltage signal Vout representing the modulated carrier signal where Vout=G $(i_{in1}-i_{in2})$; where G is the transimpedance gain of the differential amplifier 119, and $i_{in1}$ and $i_{in2}$ are the respective input currents.

The virtual earth or current mirror circuits provide low input impedances for the differential amplifier 115 to the extent that the AC-component of the voltage 306 at the amplifier inputs (represented by node 301 in FIG. 6) is virtually equal to zero. The DC-component of voltage 306 is close to the FET threshold voltage, which is usually about 0.7 volts.

Figure 3:
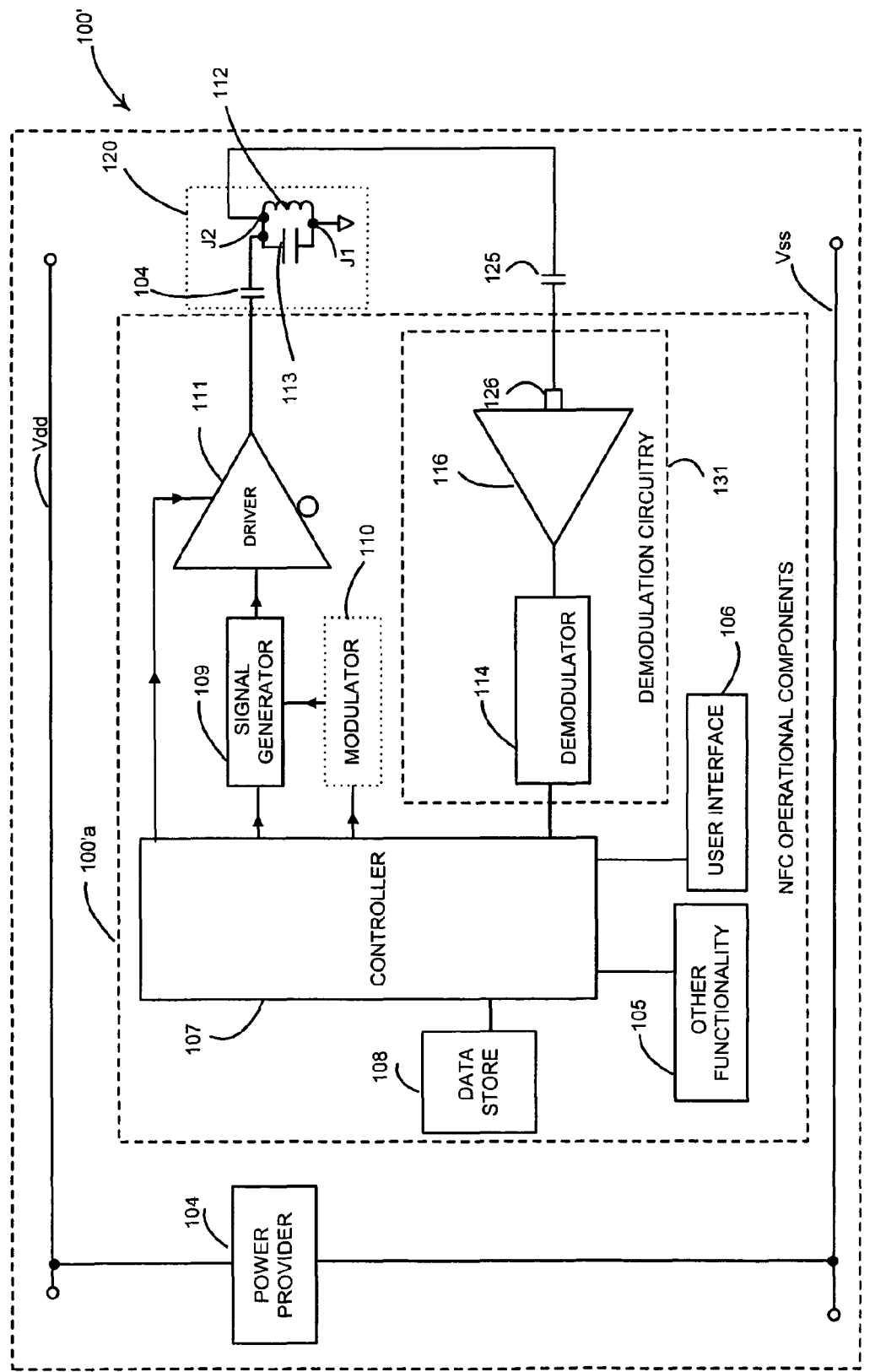
FIG. 3 shows another embodiment of an NFC communicator according to the present invention.

FIG. 3 shows another embodiment of an NFC communications-enabled device 100' having an NFC communicator 100'a according to the present invention. Where functionality is equivalent to that shown in FIG. 2, the same reference signs are used.

The NFC communicator 100a shown in FIG. 3 differs from that shown in FIG. 2 in that the driver 111 is a single output driver, one output J1 of the antenna coil is grounded and the other output J2 is coupled via capacitor 125 to the input of a single input front-end amplifier 116, which may provide low-pass filtering functionality. The input to the amplifier 116 has a low impedance input 126 in the form of a virtual earth circuit responsive to the current flowing into the corresponding input. Again the virtual earth circuit 126 may be as shown in FIG. 4 and as described above.

The capacitor 125 is like the capacitors 121 and 122 of very low capacitance and, where the NFC operational components 100a are provided by an integrated circuit, is like the antenna circuit, external to the integrated circuit.

In operation of the NFC communicator, because the modulated carrier signal input to the amplifier 116 comprises an AC voltage, and by virtue of the virtual earth circuit the impedance at the amplifier input is very low, a current flows through the low capacitance capacitor 125 into the amplifier input and the amplifier outputs a voltage signal V'out representing the modulated carrier signal V'out=G $i_{in}$; where G is the transimpedance gain of the amplifier 116, and $i_{in}$ is the amplifier input current.

The virtual earth or current mirror circuit shown in FIG. 4 may be used in any near field RF communicator where there is a requirement to receive and demodulate an RF signal. For example the circuit may be used in an RFID transceiver or RFID transponder as well as the NFC communicator shown in FIGS. 2 and 3.

One advantage of such low impedance inputs to the demodulator circuitry is that no significant reduction occurs in the Q of the antenna circuit, and hence no significant loss of coupling strength between near field RF communicators. In addition, in contrast to the case where high input impedance voltage couplings are made to the demodulation circuitry, it should not be necessary to divide-down the voltage of a received modulated carrier signal to avoid over-voltage damage which may otherwise occur when very high magnetic fields couple to the antenna coil and so the modulated carrier signal input to the demodulator may be increased or maximised. The use of such low impedance inputs may also make it easier to adjust the dynamic range in current mode by for example using switchable parallel coupled transistors in the current mirror to control the current mirror ratio.

Figure 5:
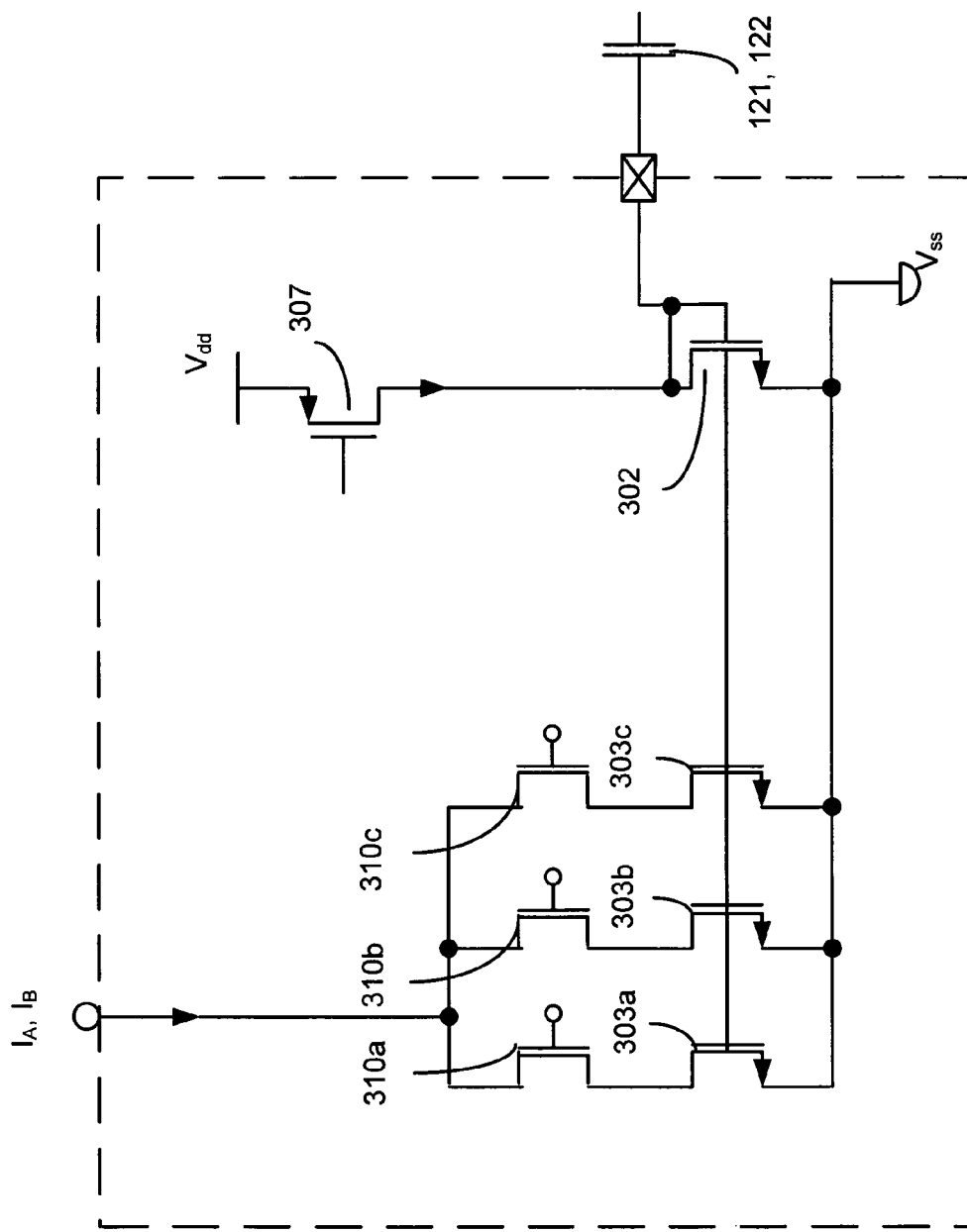
FIG. 5 shows another example of a virtual earth (virtual ground) circuit that may be used in an NFC communicator according to the present invention.

The virtual earth circuit of FIG. 4 may be modified as shown FIG. 5 so that the transistor 303 is replaced by a bank of transistors (as shown three transistors 303a, 303b and 303c) that are switchable by switches (as shown switches 310a, 310b) under the control of, for example, the controller 107 to control the current mirror ratio 310 of the virtual earth circuit. Of course where such a virtual earth circuit is used in the example shown in FIG. 2, when a transistor is switched in or out in one virtual earth circuit the corresponding transistor is switched in or out in the other virtual earth circuit.

The transistors described above will be of the appropriate conductivity type, generally n-conductivity type although it may be possible to use p-conductivity type transistors with appropriate circuit modification. Where FETs are used they will generally be enhancement mode FETs although it may be possible to use depletion mode transistors with appropriate circuit modification. Also bipolar transistors may be used where appropriate or desired. Other forms of current mirror than that described above may be used to provide virtual earth low impedance inputs where desired.

As described above the inputs to the differential amplifier or mixer are taken from opposite ends of the antenna coil. As another possibility, the antenna coil may have a grounded centre tap so that the signals at J1 and J2 are each equal to half the differential and in anti-phase.

Although particular types of current mirrors have been described above to provide the virtual earth, other known forms of current mirror may be used.

In embodiments described above, a near field RF communicator has an antenna circuit 120 to receive a modulated radio frequency signal by inductive coupling; and demodulation circuitry 130 or 131 to extract the modulation from a received modulated radio frequency signal inductively coupled to the antenna circuit. The demodulation circuitry has a virtual earth input comprising a current mirror. The demodulation circuitry may be formed by an amplifier 115 or 116 and a demodulator 114 coupled to the output of the amplifier. The amplifier may be a single input amplifier 116 coupled to an output of the antenna circuit 120 or may be a differential amplifier 115 having first and second inputs to receive the modulated radio frequency signal from first and second outputs of the antenna circuit 120. Each amplifier input provides a virtual earth input.

As described above, the high Z (impedance) input or inputs from the antenna circuitry is/are provided by capacitors 121 and 122 or capacitor 125. However, other forms of matched high Z couplings may be used. As an example, the high Z coupling could be a much higher value capacitor (for DC isolation) in series with a resistor (for V to I conversion).

As described above the capacitors are external to the integrated circuit. It may however be possible for the capacitors to be integrated, for example thick oxide capacitors may be integrated onto the circuit.

The examples described above are NFC communicators or NFC communications-enabled devices. The present invention may however also be applied in any near field RF communicator where there is a requirement to receive and demodulate an RF signal, for example in an RFID transceiver or RFID transponder.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A near field radio frequency (RF) communicator comprising:
   an antenna circuit to receive a modulated RF signal by inductive coupling; and
   demodulation circuitry to extract modulation from the received modulated RF signal inductively coupled to the antenna circuit, wherein the demodulation circuitry includes a differential amplifier having first and second virtual earth inputs formed with respective first and second current mirrors to input the received modulated RF signal.

2. The near field RF communicator according to claim 1, wherein the demodulation circuitry comprises a demodulator coupled to a single output of the differential amplifier.

3. The near field RF communicator according to claim 1, wherein the differential amplifier comprises a transimpedance amplifier.

4. The near field RF communicator according to claim 1, wherein the first virtual earth input is configured to receive a first modulated RF signal from a first output of the antenna circuit and the second virtual earth input is configured to receive a second modulated RF signal from a second output of the antenna circuit and wherein the demodulation circuitry is configured to extract the modulation from the received modulated RF signal using both the first and second modulated RF signals.

5. The near field RF communicator according to claim 4, further comprising:
   a first capacitor coupled between the first output of the antenna circuit and the first virtual earth input, and a second capacitor coupled between the second output of the antenna circuit and the second virtual earth input.

6. The near field RF communicator according to claim 4, wherein a coil of the antenna circuit is coupled across the first and second outputs of the antenna circuit.

7. The near field RF communicator according to claim 1, wherein each current mirror comprises a diode-coupled transistor having a main electrode coupled to a corresponding input and a further transistor having its control gate coupled to a control gate of the diode-coupled transistor such that, in operation, a current at an input of the demodulation circuitry is mirrored by the further transistor to provide an input current to the demodulation circuitry.

8. The near field RF communicator according to claim 7, wherein the diode-coupled transistor and the further transistor are field effect transistors.

9. The near field RF communicator according to claim 1, further comprising a modulator configured to modulate a RF signal in accordance with data to enable communication of data by the near field RF communicator.

10. The near field RF communicator according to claim 1, further comprising a signal generator configured to provide a RF signal and wherein the signal generator is configured to cause modulation of the RF signal in accordance with data to enable communication of data by the near field RF communicator.

11. The near field RF communicator according to claim 1, further comprising a data store configured to store data, a modulator configured to modulate a RF signal in accordance with data, and a controller configured to initiate near field RF communication with another near field RF communicator and configured to respond to near field RF communication initiated by another near field RF communicator.

12. The near field RF communicator according to claim 1, further comprising a power deriver configured to derive power from a RF signal inductively coupled to the coupler.

13. The near field RF communicator according to claim 1, wherein the near field RF communicator is an NFC communicator.

14. A near field radio frequency (RF) communicator comprising:
   an antenna circuit configured to receive a modulated RF signal by inductive coupling; and
   demodulation circuitry configured to extract modulation from the received modulated RF signal inductively coupled to the antenna circuit, wherein the demodulation circuitry has a first virtual earth input formed with a first current mirror configured to receive a first modulated RF signal from a first output of the antenna circuit and a second virtual earth input formed with a second current mirror configured to receive a second modulated RF signal from a second output of the antenna circuit and is configured to extract modulation from the received modulated RF signal using, both the first and second modulated RF signals.

15. The near field RF communicator according to claim 14, wherein the demodulation circuitry comprises:
   a differential amplifier having a first virtual earth circuit coupled to a non-inverting input, a second virtual earth circuit coupled to an inverting input and an output; and
   a demodulator coupled to the output of the differential amplifier, the first virtual earth circuit being coupled to the first output of the antenna circuit and the second virtual earth circuit being coupled to the second output of the antenna circuit.

16. The near field RF communicator according to claim 14, further comprising a first capacitor coupled between the first virtual earth input and the first output of the antenna circuit, and a second capacitor coupled between the second virtual earth input and the second output of the antenna circuit.

17. The near field RF communicator according to claim 14, wherein the first and second current mirrors have substantially the same operating characteristics.

18. The near field RF communicator according to claim 14, wherein each current mirror comprises a diode-coupled transistor having a main electrode coupled to a corresponding input and a plurality of parallel coupled transistors, wherein a control gate of each of the plurality of parallel coupled transistors is coupled to a control gate of the diode-coupled transistor, and wherein a current at the corresponding input is mirrored by one transistor of the plurality of parallel coupled transistors selectively enabled by the near field RF communicator to provide an input current to the demodulation circuitry.

* * * * *